Sept. 21, 1965    C. I. BOYER    3,207,543
LATCH MECHANISM
Filed Dec. 28, 1962    2 Sheets-Sheet 1

INVENTOR.
Clyde I. Boyer
BY
E. E. James
ATTORNEY

Sept. 21, 1965  C. I. BOYER  3,207,543
LATCH MECHANISM
Filed Dec. 28, 1962  2 Sheets-Sheet 2

INVENTOR.
Clyde I. Boyer
BY
E. E. James
ATTORNEY

United States Patent Office 3,207,543
Patented Sept. 21, 1965

3,207,543
LATCH MECHANISM
Clyde I. Boyer, Ferndale, Mich., assignor to General Motors Corporation, Detroit, Mich., a corporation of Delaware
Filed Dec. 28, 1962, Ser. No. 248,007
1 Claim. (Cl. 292—52)

This invention relates to an improved latch mechanism particularly adapted for use with an automotive vehicle hood having a primary and a secondary safety latching means and a single operating means for releasing both latching means.

The invention provides a relatively simple compact automotive vehicle hood latch mechanism having a minimum number of parts. These parts are easily and economically fabricated and assembled and cooperate to accommodate substantially greater tolerances than have heretofore been permitted in such latch mechanisms.

In a preferred illustrative embodiment herein shown and described, a primary latching member cooperates with a latch mounting member to slideably pilot and latchably engage a striker member during movement of a vehicle hood or closure member to a closed position relative to a vehicle body compartment. In the closed position of the closure member, a secondary latching member is normally maintained in a safety position providing potential latching engagement with a secondary striker flange to limit accidental opening of the closure member to a partially opened position. The primary latching member is engageable with and adapted to carry the safety latching member to a flange disengaging position upon movement of the primary latching member to a striker bolt disengaging position. Such movement of the primary latching member is effected either by a single operating lever coaxially pivoted and having a one-way latch disengaging driving connection therewith or by striker camming of the primary latching member during closing movement of the hood member.

The foregoing and other objects, advantages and features of the invention will be apparent from the following description of a preferred illustrative embodiment having reference to the accompanying drawings, in which.

Figure 1:
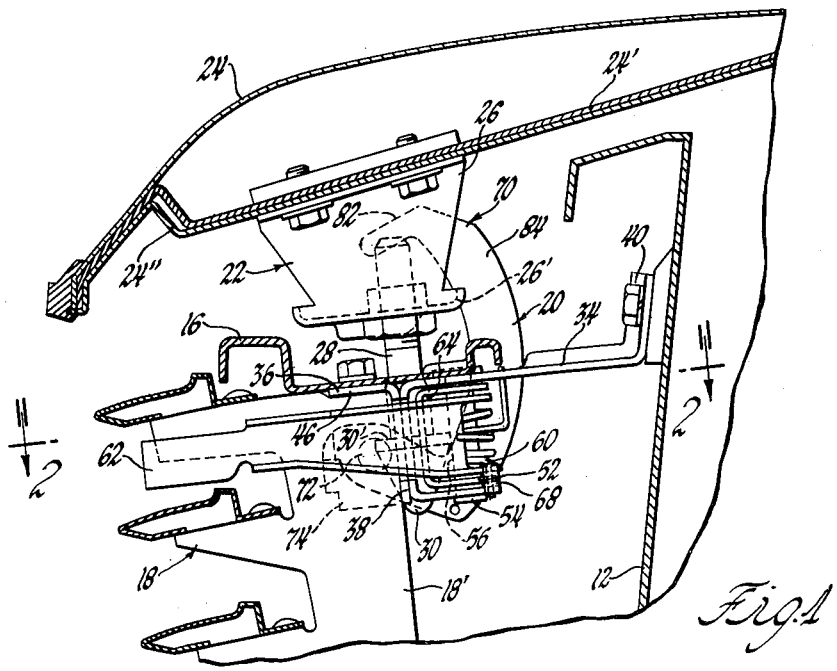
FIGURE 1 is a fragmentary sectional view of an automotive vehicle body with portions broken away and sectioned to show the latch mechanism of the invention in side elevation.
Figure 3:
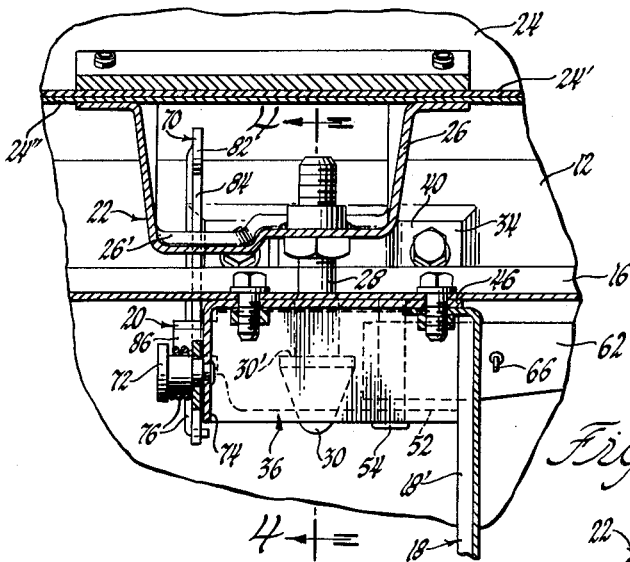
FIGURE 3 is a fragmentary sectional view taken substantially in the plane indicated at 3—3 of FIGURE 2.
Figure 4:
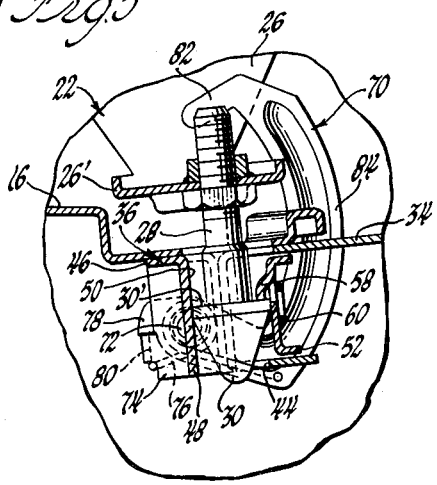
FIGURE 4 is similar to a portion of FIGURE 1 and sectioned substantially in the plane indicated at 4—4 of FIGURE 3 to show the several elements in their hood closed, latch engaged positions.

The automotive vehicle body partially shown in the several drawing figures includes an engine compartment defining transverse member 12. A second transversely extending body member 16 supports the upper end of a front grille structure 18 located forwardly of the member 12. As best shown in FIGURES 1 and 3, the transverse members 12 and 16 support an illustrative hood latch mechanism 20 extending therebetween. This latch mechanism operably engages a striker assembly 22 carried by the front end of a hood structure 24 to latch the hood in a closed position relative to the engine compartment. The hood is suitably hinged adjacent its rearward distal end, not shown, for upward swinging movement opening the engine compartment.

The striker assembly 22 comprises a bracket 26 of U-shaped channeled cross section having flanged legs secured as shown transversely of underhood framing members 24' and 24". A nut-locked striker bolt 28 is threadably supported by the bight portion 26' to one side of the striker bracket 26. The striker bolt projects downwardly from its mounting bracket and has a conically tapered head 30 defining an annular shoulder 30' engageable by the latch mechanism 20 to maintain the hood in its closed position.

The latch mechanism 20 includes a mounting bracket comprising two stamped members 34 and 36 suitably secured together at 38. The member 34 has an upstanding end flange 40 secured to the body member 12 as shown. A primary latch mounting clevis formed on the opposite end of member 34 has an opening 44 adapted to spacedly receive the striker head 30. The member 36 has a mounting flange 46 secured to the body member 16 and a grille supporting member 18'. A second flange 48 on the bracket member 36 is secured to the member 34 and has a semicylindrical recess 50 for slideably piloting the striker head during movement of the hood to its compartment closing, latched position.

A primary latching lever 52 is pivotally mounted by a pin 54 for swinging movement between the spaced clevis defining portions of bracket member 34. An intermediate portion of lever 52 provides a semicylindrical surface 56 cooperating with the recess 50 of bracket member 36 to pilot the striker head 30 during hood closing movement. This intermediate lever portion is pierced to form an inclined ramp or flange 58 engageable with the striker head to latch the hood in its closed position. During hood closing movement, the striker head 30 slideably cams the flange 58 to swing latching level 52 to a pivotally retracted position against the biasing action of a spring 60 embracing the pivot pin 54. This spring rests against the bracket member 34 and torsionally biases the primary latching lever 52 toward the bracket member 36 and latching engagement with the striker head.

Figure 2:
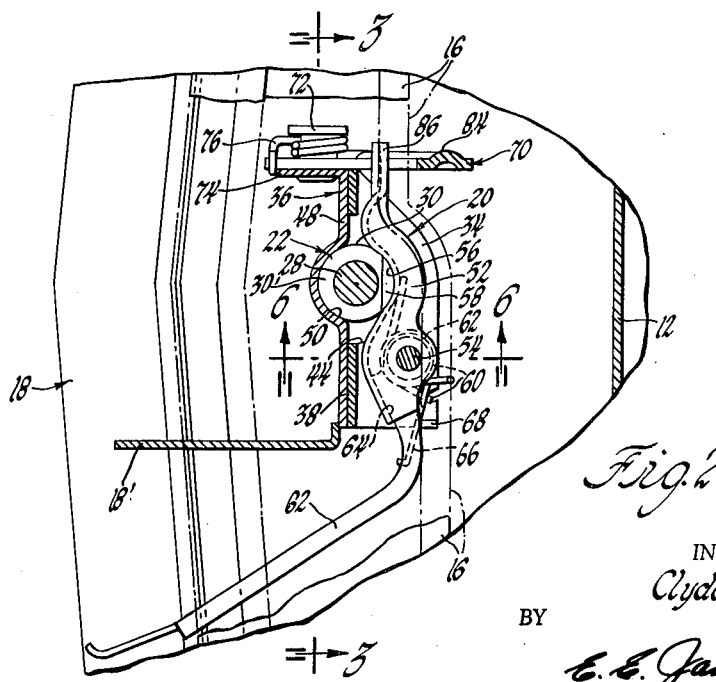
FIGURE 2 is a fragmentary sectional view taken substantially in the plane indicated at 2—2 of FIGURE 1.
Figure 5:
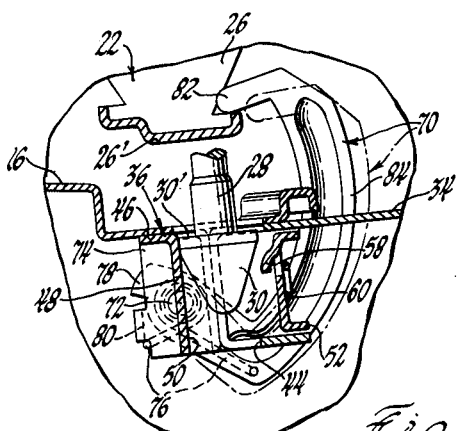
FIGURE 5 is a view similar to FIGURE 4 showing the several elements in safety latching and disengaging positions.
Figure 6:
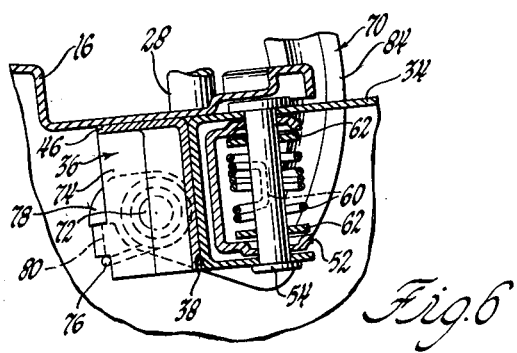
FIGURE 6 is a sectional view of the latching mechanism taken substantially and in the plane indicated at 6—6 of FIGURE 2.

An operating lever 62 pivotally mounted by pin 54 provides a one-way driving connection 64 for actuating the primary latching lever 52 in a clockwise direction as viewed in FIGURE 2 to a striker disengaged, retracted position shown in FIGURE 5. A spring 66 embracing the pin 54 reacts against the bracket member 34 to torsionally bias the operating lever toward engagement with a limit flange or boss 68 on member 34. This limit flange or boss cooperates with the one-way driving connection 64 to limit spring biased movement of the primary latching lever 52 in a counterclockwise latching direction as viewed in FIGURE 2 to a striker receiving position spaced from the piloting recess of bracket member 36.

A secondary safety latch lever 70 is pivoted at its lower end by a stud 72 supported by and projecting from a flange 74 on the bracket member 36. The lever 70 is thus supported for swinging movement normal to the swinging movement of the primary latch member. A helical spring 76 embraces the stud 72 and reacts against the bracket flange 74 to torsionally bias the safety latch lever in a counterclockwise direction, as viewed in FIGURES 1 and 4–6, toward limiting engagement between a dog 78 on the lever 70 and a flange 80 formed on the bracket side flange 74. Such spring biased movement carries the upper end 82 of lever 70 into spaced potential latching engagement with the bight portion 26' of the striker mounting bracket 26. Opening movement of the hood 24 occasioned by accidental disengagement of the primary latching lever 52 is thus limited to a slightly opened safety latched position. A bowed intermediate portion 84 of the lever 70 is engageable by the free end 86 of the primary latching lever and swingable to a retracted position out of potential engagement with the bracket 26 either by manual latch disengaging movement of the latch operating lever 62 or by striker camming of the primary latching lever during hood closing movement.

From the foregoing description of a preferred illustrative embodiment, it will be seen that the invention provides a relatively simple compact latch mechanism providing the several stated objectives and advantages. Various modifications and changes might be made therefrom without departing from the spirit and scope of the invention as defined in the following claim.

I claim:

In combination with a vehicle body member having a closure member mounted thereon for movement between open and closed positions, mounting means connected to one of said members, a latch mechanism comprising a striker member mounted on said mounting means and having a conical head, a bracket mounted on the other of said members and including a semi-cylindrical recess slidably engageable with a first portion of the striker head upon movement of the closure member to the closed position, a primary latching lever pivotally mounted on said other member for movement toward and away from said bracket, said primary latching lever having a semi-cylindrical recess slidably engageable with a second portion of said striker head generally opposite to the first portion thereof upon movement of the closure member to the closed position, said lever being located in the path of movement of said striker head when said closure member is in the open position and including a flange defining a ramp slidably engageable with said striker head upon movement of said closure member to the closed position to move said lever out of the path of movement of said head, the end of said flange being engageable with said head to latch the closure member in its closed position with said striker head being slidably engaged by both said bracket recess and said latch lever recess, actuating means for moving said primary latching lever out of the path of movement of said striker head, a secondary latching lever pivotally mounted on said other member for movement toward and away from said bracket and having a safety latching position located in the path of movement of said striker member mounting means, said primary latching lever being engageable with and operable to swing said secondary latching lever away from said safety latching position to permit movement of said closure member from the closed position to the open position upon actuation of said actuating means and operable to swing said secondary latching lever out of the path of movement of said striker member mounting means upon engagement of said striker head with said primary latching lever during movement of said closure member from the open position to the closed position, and means biasing said primary and secondary latching levers toward said bracket.

References Cited by the Examiner

UNITED STATES PATENTS

| | | | |
|---|---|---|---|
| 272,333 | 2/83 | Sargent | 292—304 |
| 1,607,263 | 11/26 | Ledwinka | 292—226 |
| 2,010,492 | 8/35 | Karre | 292—226 X |
| 2,104,562 | 1/38 | Johnson | 292—228 |
| 2,274,696 | 3/42 | Hill et al. | 292—225 |
| 2,841,430 | 7/58 | Krause | 292—11 |

FOREIGN PATENTS 609,896   12/60   Canada.

M. HENSON WOOD, JR., *Primary Examiner.*